Dec. 11, 1962

A. BRUNSCHWEIGER 3,068,366

UNIPOLAR GENERATOR

Filed June 30, 1958

INVENTOR
Alfred Brunschweiger

BY Sughrue & Rothwell

ATTORNEYS

3,068,366
UNIPOLAR GENERATOR

Alfred Brunschweiger, Poughkeepsie, N.Y., assignor to International Business Machines Corporation, New York, N.Y., a corporation of New York Filed June 30, 1958, Ser. No. 745,673
1 Claim. (Cl. 307—88.5)

This invention relates to a unipolar generator and more particularly to a generator for generating output pulses of a uniform polarity regardless of the polarity of the input signal thereto.

In a conventional differentiator circuit, a square wave input thereto will result in a positive pulse output corresponding in time to the positive excursion of the square wave and a negative pulse output corresponding in time to the negative excursion of the square wave. In some cases, for instance in information handling systems which utilize substantially square wave pulses, it is often necessary to employ means to provide pulses of uniform polarity regardless of the polarity of the excursion of the input signals thereto. Such a means may be called a unipolar generator. It is to such a generator that this invention relates. It functions to provide a unipolar pulse output for each excursion, positive or negative, of the input signal thereto.

It is therefore an object of this invention to provide a unipolar generator to generate pulses of uniform polarity corresponding in time to each positive and negative excursion of the input signal thereto.

It is a further object of this invention to differentiate each positive and negative excursion of the input signal to said generator and to provide differentiated pulses therefrom of uniform polarity.

These and other objects will become apparent from a detailed description of the accompanying drawings.

Figure 1:
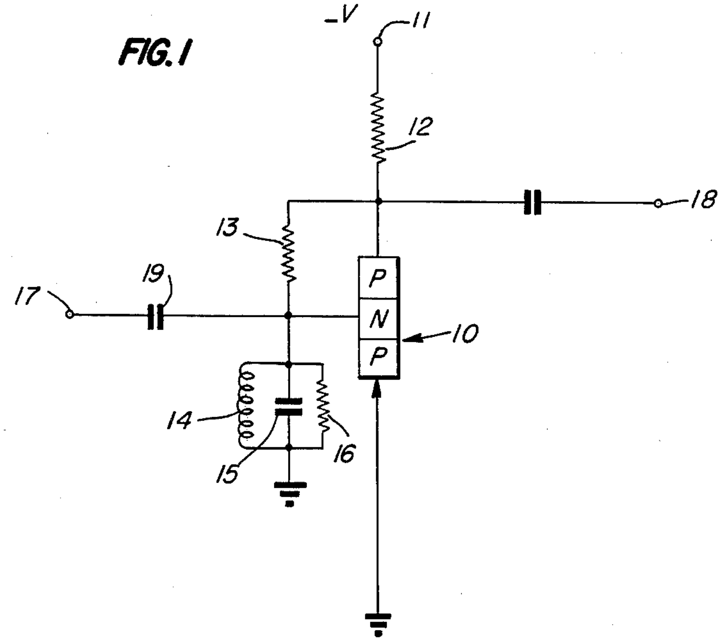
FIGURE 1 is a view of a circuit diagram illustrating the unipolar generator of this invention.
Figures 2A, 2B:
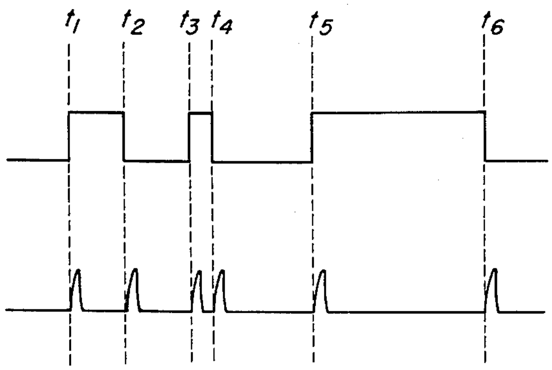
FIGURE 2A is a view showing the wave form of an input signal to the generator of this invention and FIGURE 2B is a view showing the wave form of the output signal from said generator resulting from the input signal of FIGURE 2A.

Turning to the drawings, a transistor 10 which may be a PNP type to provide positive going output pulses from the generator is a grounded emitter type. There is a voltage divider between $-V_1$ at terminal 11 and ground including resistors 12 and 13 and the tank circuit including inductance 14 and condenser 15 shunted by resistor 16, and the base of transistor 10 is connected to a point between resistors 13 and 16. Inductance 14 functions to short the base of transistor 10 to ground, making it nonconductive. Upon the application of a signal having a wave form as shown in FIGURE 2A to the input terminal 17 and through condenser 19 to the base of transistor 10, said base is driven positively at time $t_1$. Condenser 15 and the distributed capacitance of the tank circuit begin to charge towards this positive potential due to this positive excursion at the input and transistor 10 remains cutoff. Transistor 10 will remain cutoff during this initial transition period. When this period is terminated by the charging of the capacitance in the tank circuit to the positive potential, the tank circuit will begin to oscillate or ring at or near its resonant frequency. The initial charging of the capacitance merely serves to further reverse bias transistor 10 but when the ringing commences the tank circuit will cause the base of transistor 10 to swing below ground to forward bias said transistor. The transistor then conducts and output terminal 18 swings positively. The time of this positive swing substantially corresponds to time $t_1$ and is approximately one-quarter period after the tank circuit commences to oscillate. The transistor 10 amplifies the negative oscillation of the tank circuit and provides a positive pulse at terminal 18 during this oscillation. When the tank circuit oscillates and transistor 10 is conducting resistor 16 damps said oscillation sufficiently to prevent the tank circuit from going through another cycle. Therefore, transistor 10 is rendered nonconducting when the tank circuit again drives the base potential to ground from its negative peak. Transistor 10 is thereby rendered nonconductive and the ringing of the tank circuit is limited to approximately one period of oscillation. The output pulse at terminal 18 corresponds in time to approximately the last one-half period of said oscillation.

When at time $t_2$ the input signal swings in a negative direction the transistor immediately conducts. This produces a positive swing at terminal 18. The resistor 16 will effectively damp the tank circuit to prevent its generating more than one negative cycle of oscillation. The negative cycle of the tank circuit determines the duration of the output pulse at terminal 18.

The main function of resistor 16 is to determine the effective loading of the tank circuit and the degree of peaking desired by the transistor 10 when it is turned on. The smaller the value of resistor 16 the less the loading. Best operation of the circuit is achieved when the rise or fall time of the input signal is short compared to its pulse width. The wave form of the input signal should preferably have a flat-topped portion with sufficiently small curvature to allow the tank circuit to recover before the next change of slope in the input signal arrives.

The amplitude of the pulse output associated with the positive excursion of the square wave input can be made equal to the amplitude of the output pulse due to the negative excursion of the square wave input by adjustment of resistor 16. The output pulse width can be adjusted by adjustment of condenser 15. In a typical example, when the inductance 14 equals 10 microhenries and condenser 15 equals 0 and the capacitance of the tank circuit is provided solely by the distributed capacitance of the inductance, pulses whose width were approximately 70 millimicroseconds were obtained.

The unipolar generator of this invention may be employed for generating pulses of double frequency from repetitive square waves. Also since the positive input slope going into the transistor is stored in the tank circuit for approximately one-quarter the period of the natural frequency of said tank circuit, the unipolar generator of this invention is capable of functioning as a delay device designed to delay pulses of one polarity with respect to pulses of opposite polarity.

What has been shown and described is one embodiment of the present invention. Other embodiments obvious to those skilled in the art from the teachings herein are contemplated to be within the spirit and scope of the accompanying claim.

What is claimed is:

A unipolar generator for generating unipolar pulses at the output thereof in response to either a positive or a negative excursion of an input signal thereto, comprising a variable impedance element having at least three electrodes, one of said electrodes functioning to control the current to said element, said variable impedance element comprising a transistor having base, collector and emitter electrodes, said transistor base electrode being utilized as said control electrode, means to bias said element so that it has one stable state and one unstable state, said element being normally in its stable state in the absence of an input signal thereto, means to feed either a negative or a positive excursion of said input signal to said control electrode, said means being in the form of a coupling capacitor, an oscillation circuit connected to said control electrode and adapted to be driven into oscillation by an excursion of said input signal whereby a portion of a cycle of said oscillation switches the element from its stable state to its unstable state, said oscillation circuit comprising a parallel resonant circuit, said parallel resonant circuit connected in parallel with said transistor, one end of said parallel resonant circuit being connected to said base electrode of said transistor, means to connect the other end of said parallel resonant circuit to said source, means to connect the said emitter electrode to said source to normally bias said transistor in said stable state which is a relatively low current conducting state whereby a positive excursion of said input signal applied to said base electrode will change the capacitance of said oscillator circuit to a peak potential determined by said positive excursion and to thereafter initiate the oscillation thereof, the negative excursion of said oscillation causing said transistor to switch to said unstable state which is one of relatively high current conduction, and whereby a negative excursion of said input signal will immediately switch said transistor to said unstable state of high current conduction for a duration approximately equal to one-half the period of oscillation of said parallel resonant circuit, means to provide a unipolar output signal from said element during its unstable state and means to limit said oscillation to a maximum of one cycle for each excursion of said input signal.

References Cited in the file of this patent

UNITED STATES PATENTS

| | | |
|---|---|---|
| 2,462,061 | Beatty | Feb. 22, 1949 |
| 2,524,677 | O'Brien | Oct. 3, 1950 |
| 2,549,776 | Cleeton | Apr. 24, 1951 |
| 2,808,513 | Maynard | Oct. 1, 1957 |
| 2,810,073 | Bradmiller | Oct. 15, 1957 |
| 2,820,145 | Wolfendale | Jan. 14, 1958 |
| 2,843,761 | Carlson | July 15, 1958 |
| 2,898,478 | Haugen | Aug. 4, 1959 |
| 2,906,892 | Jones | Sept. 29, 1959 |
| 2,913,597 | Rowe | Nov. 17, 1959 |
| 2,921,206 | Kidd | Jan. 12, 1960 |

FOREIGN PATENTS

| | | |
|---|---|---|
| 474,829 | Italy | Oct. 2, 1952 |